US010488081B2

(12) United States Patent
High et al.

(10) Patent No.: US 10,488,081 B2
(45) Date of Patent: Nov. 26, 2019

(54) APPARATUSES AND METHODS FOR PROVIDING TEMPERATURE CONTROLLED PORTABLE CONTAINER

(71) Applicant: Walmart Apollo, LLC, Bentonville, AR (US)

(72) Inventors: Donald R. High, Noel, MO (US); David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/454,900

(22) Filed: Mar. 9, 2017

(65) Prior Publication Data

US 2017/0261237 A1 Sep. 14, 2017

Related U.S. Application Data

(60) Provisional application No. 62/306,570, filed on Mar. 10, 2016.

(51) Int. Cl.
*F25B 9/04* (2006.01)
*G06Q 10/08* (2012.01)
(Continued)

(52) U.S. Cl.
CPC ............... *F25B 9/04* (2013.01); *F25B 49/00* (2013.01); *F25D 11/00* (2013.01); *F25D 23/065* (2013.01);
(Continued)

(58) Field of Classification Search
CPC ........ F25D 23/065; F25D 11/00; F25D 23/06; F25D 17/02; F25D 3/14; F25D 31/005;
(Continued)

(56) References Cited

U.S. PATENT DOCUMENTS 3,553,971 A 1/1971 Crang
4,688,395 A 8/1987 Holcomb
(Continued)

FOREIGN PATENT DOCUMENTS

EP 2246814 11/2010

OTHER PUBLICATIONS

PCT; App. No. PCT/US2017/021496; International Search Report and Written Opinion dated Jul. 20, 2017.

(Continued)

*Primary Examiner* — Orlando E Aviles
(74) *Attorney, Agent, or Firm* — Fitch, Even, Tabin & Flannery LLP (57) ABSTRACT

Systems, apparatuses, and methods are provided herein for providing temperature control. An apparatus for temperature control comprises a portable housing configured for delivery of items, an insulated storage compartment in the portable housing and configured to hold a plurality of items during a transport of the portable housing, a temperature control device configured to affect the temperature inside the insulated storage compartment, and a host coupler configured to couple with a host temperature control system to allow the host temperature control system to affect the temperature inside the insulated storage compartment. Wherein the temperature control device is configured to affect the temperature inside the insulated storage compartment without the host coupler being coupled to the host temperature control system.

24 Claims, 4 Drawing Sheets

(51) Int. Cl.
*F25D 11/00* (2006.01)
*F25D 23/06* (2006.01)
*F25B 49/00* (2006.01)

(52) U.S. Cl.
CPC ..... *G06Q 10/0832* (2013.01); *G06Q 10/0836* (2013.01); *F25B 2700/21* (2013.01); *F25D 2400/14* (2013.01); *F25D 2400/16* (2013.01)

(58) Field of Classification Search
CPC .......... F25D 2303/082; G06Q 10/0836; G06Q 10/0832; F25B 9/04; F25B 49/00; F25B 2700/21; F25B 21/02; F25B 21/04
USPC .......................................................... 62/239
See application file for complete search history.

(56) References Cited

U.S. PATENT DOCUMENTS

| | | | | |
|---|---|---|---|---|
| 5,331,817 | A * | 7/1994 | Anthony | A47J 36/28 62/293 |
| 6,246,998 | B1 | 6/2001 | Matsumori | |
| 6,953,913 | B1 | 10/2005 | Hara | |
| 7,963,073 | B1 * | 6/2011 | Pellegrene | E04B 1/34823 109/83 |
| 8,442,876 | B1 * | 5/2013 | Rogers | G06Q 10/087 705/1.1 |
| 8,924,007 | B2 | 12/2014 | Arunapuram | |
| 9,008,827 | B1 | 4/2015 | Dwarakanath | |
| 9,127,872 | B1 | 9/2015 | Chainey | |
| 2003/0159595 | A1 * | 8/2003 | Kiefer | A23B 7/144 99/468 |
| 2005/0154602 | A1 * | 7/2005 | Hertz | G06Q 10/08 345/540 |
| 2006/0016213 | A1 | 1/2006 | Al Rashidi | |
| 2007/0028642 | A1 | 2/2007 | Glade | |
| 2007/0078722 | A1 * | 4/2007 | Saxena | G06Q 30/0267 705/14.64 |
| 2007/0256440 | A1 * | 11/2007 | Trotter | F25D 11/00 62/298 |
| 2008/0123288 | A1 * | 5/2008 | Hillis | H05K 7/1497 361/679.34 |
| 2009/0101711 | A1 | 4/2009 | Grayson | |
| 2009/0156241 | A1 * | 6/2009 | Staffaroni | G06Q 10/06311 455/466 |
| 2009/0159715 | A1 * | 6/2009 | Lessig | F25B 9/04 236/47 |
| 2011/0147417 | A1 * | 6/2011 | Kuehl | F25D 29/00 62/449 |
| 2011/0203297 | A1 * | 8/2011 | Oberweis | F25D 3/14 62/56 |
| 2012/0210677 | A1 * | 8/2012 | Proskin | F25D 3/08 53/440 |
| 2013/0051959 | A1 * | 2/2013 | Alghamdi | A47B 61/04 414/273 |
| 2013/0147634 | A1 * | 6/2013 | Abraham, III | H04Q 9/00 340/870.02 |
| 2015/0068232 | A1 * | 3/2015 | Petrov | F25D 3/107 62/125 |

OTHER PUBLICATIONS

Archambault, Jason; "How to Properly Package and Ship Perishable Products", Fastpack Packaging, http://www.fastpack.net/blog/how-to-properly-package-and-ship-perishable-products/, Jun. 22, 2014, pp. 1-2.
Cryopak; "Insulated Shipping Containers (Parcel)", http://www.cryopak.com/en/cold-chain-packaging/insulated-shipping-containers-parcel/, printed Dec. 18, 2015, pp. 1.
Fedex, "Temperature-Controlled Shipping", http://www.fedex.com/auhealthcare/temp-control.html#tab2, printed Dec. 18, 2015, pp. 1-2.
Sustainable Thermal Packaging; "Nomad Portable, Flexible, & Reusable Shipping Containers", http://www.sustainablethermalpackaging.com/products/insulated-packaging/nomad-portable-flexible-reusable-cooler-bags/, printed Dec. 18, 2015, pp. 1-2.
Wikipedia; "Vortex tube", https://web.archive.org/web/20160310163936/https://en.wikipedia.org/wiki/Vortex_tube, Feb. 10, 2016, pp. 1-5.

* cited by examiner

APPARATUSES AND METHODS FOR PROVIDING TEMPERATURE CONTROLLED PORTABLE CONTAINER

RELATED APPLICATION

This application claims the benefit of the following U.S. Provisional Application No. 62/306,570 filed Mar. 10, 2016, which is incorporated herein by reference in its entirety.

TECHNICAL FIELD

This invention relates generally to delivery containers.

BACKGROUND

Some goods, such as dairy and frozen foods, are required to be refrigerated during delivery and for storage. When products ordered by a customer for delivery, the products first leave the distribution center environment and are placed in the environment of a delivery vehicle. The products are then moved from the delivery vehicle to a customer's home. At the customer's home, the customer then transfers the products to their refrigerator.

BRIEF DESCRIPTION OF THE DRAWINGS

Disclosed herein are embodiments of apparatuses and methods for temperature control. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for temperature control. An apparatus for temperature control comprises a portable housing configured for delivery of items, an insulated storage compartment in the portable housing and configured to hold a plurality of items during a transport of the portable housing, a temperature control device configured to affect the temperature inside the insulated storage compartment, and a host coupler configured to couple with a host temperature control system to allow the host temperature control system to affect the temperature inside the insulated storage compartment. Wherein the temperature control device is configured to affect the temperature inside the insulated storage compartment without the host coupler being coupled to the host temperature control system.

In some embodiments, a reusable and removable refrigerator for enhancing product safety and longevity is provided. The refrigerated container may comprise an insulated metal container with a cooling mechanism and may address cold chain issues. In some embodiments, a reusable refrigerator may comprise a portable insulated lightweight metal container. The reusable refrigerators may come in various shapes and sizes selectable based on consumer request. In some embodiments, a consumer may lease one or more reusable refrigerators of selected size. When a new reusable refrigerator order is delivered via a reusable refrigerator service, a customer's current reusable refrigerator may be removed and replaced with a clean, fully stocked (to consumer direction) reusable refrigerator. A delivered reusable refrigerator may generally be placed anywhere at customer's location with adequate space. Each reusable refrigerator may be configured to hold perishables for a certain amount of time (based on the size of each unit and environmental conditions) unplugged. In some embodiments, a reuse refrigerator may be equipped with the vortex tubing for cooling the container.

In some embodiments, the portable refrigerators may use vortex tube technology to keep products cold. In some embodiments, a central computer system may automatically notify a customer that a delivery is being made when a driver GPS is at the delivery location. In some embodiments, the portable refrigerator may comprise heavily insulated lightweight metal containers that can keep its content cool with or without a power supply.

In some embodiment, a new type of home appliance is provided. In some embodiment, portable containers used as shipping totes may transform/assemble into a refrigerator/freezer. With a reusable container service, instead of packing a tote with perishables, items are packed and shipped with a refrigeration unit. The service may reduce the time needed for bagging, handling, and putting the groceries away. In some embodiments, home delivery of perishables in a stackable refrigerated container may replace a traditional refrigerator appliance. In some embodiments, units may be assembled into a multi-compartment food storage appliance similar in size and function to a refrigerator. When subscribing customers need to place an order, they may select the module/compartment to be replenished and/or select the products (manually or automatically) to be delivered with the unit. A unit may be packed and delivered directly to the customer's home. The empty unit may be first disconnected and removed from the stack and the stocked unit may be inserted in its place. The empty unit may be retrieved and remaining food items disposed of. The empty unit may then be cleaned and made ready for the next customer. In embodiments, customers who sign up for the service essentially lease a modular refrigerator assembly and the service keeps the modular refrigerator stocked, cleaned, and inventoried. The modular refrigerator could be kept in the home, on a patio, a deck, in a garage, under a carport, etc.

Figure 1:
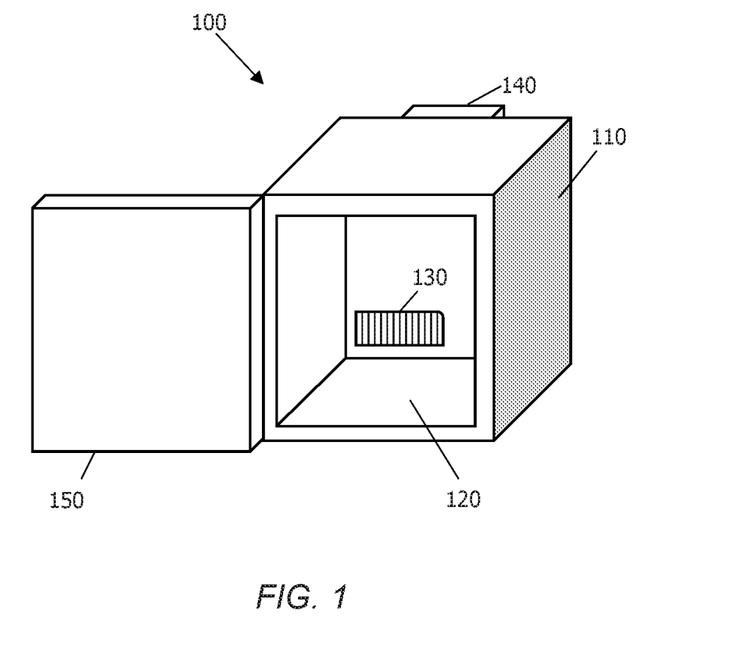
FIG. 1 is an illustration of a portable container unit in accordance with several embodiments.

Referring now to FIG. 1, an apparatus for temperature control is shown. The portable container 100 comprises a portable housing 110, an insulated storage compartment 120 accessible through a door 150, a temperature control device 130, and a host coupler 140.

The portable housing 110 may generally comprise any housing configured to be picked up and transported. In some embodiments, the portable housing 110 may be lightweight and configured to be carried by a single person or two people (e.g. under 30 lbs, 50 lbs etc.). In some embodiments, the portable housing 110 may comprise one or more of a metal, a metal alloy, a plastic, a composite, etc. Generally, the portable housing 110 may comprise any rigid or semi-rigid material configured to hold the shape of portable container 100 and withstand the stress of transport and daily use. In some embodiments, the portable housing 110 may be configured to stack with other portable housings enclosing insulated storage compartments. In some embodiments, the portable housing 110 may be configured to be coupled to and/or be received within a host temperature control system. In some embodiments, the portable housing may comprise a handle and/or a handhold indentation.

A portion of the portable housing 110 may comprise a door 150 for accessing the insulated storage compartment 120. The door 150 may comprise one or more insulated material and provide a seal to the opening of the insulated storage compartment 120 when closed. In some embodiments, the door 150 comprises a front opening access door that is accessible when a plurality of portable housings are stacked and/or when the portable housing is coupled to a host temperature control system. In some embodiments, the portable container 100 may be top-opening. In some embodiments, the insulated storage compartment 120 may comprise one or more sliding drawers with or without a swinging type door. In some embodiments, the portable housing 110 may be configured to operate in two or more orientations (e.g. front accessing and top accessing).

The insulated storage compartment 120 may comprise a compartment within the portable housing 110 configured to hold one or more items in temperature controlled environment for transport and storage. The insulated storage compartment 120 may be formed by one or more insulating layers lining the interior of the portable housing 110. In some embodiments, the insulated storage compartment 120 may be configured to maintain the interior temperature within a narrow range for a least a set period of time (e.g. no more than a 5-degree temperature rise or drop within 6 hours in room temperature, etc.) In some embodiments, the insulated storage compartment 120 may comprise one or more fixed or configurable sub-compartments.

The temperature control device 130 may comprise a device configured to affect the temperature inside the insulated storage compartment 120. In some embodiments, the temperature control device 130 may comprise a powered active cooling and/or heating device configured to lower and/or raise the temperature in the insulated storage compartment 120. In some embodiments, the temperature control device 130 may comprise a vortex tube cooling system. In some embodiments, the temperature control device 130 may employ one or more cooling methods comprising: vapor-compression cycle, acoustic cooling, air cycle, magnetic cooling, Malone engine, pulse tube, thermoelectric cooling, thermionic cooling, vortex tube, and water cycle systems, etc. In some embodiments, the temperature control device 130 may be configured to affect the temperature inside the insulated storage compartment without the host coupler being coupled to a host temperature control device.

In some embodiments, the temperature control device 130 may be powered by a power source comprising one of more of a power cord, a power port, a power adapter, and a battery. In some embodiments, portable container 100 may comprise a rechargeable battery for powering the temperature control device 130. In some embodiments, the temperature control device 130 is configured to affect the temperature inside the insulated storage compartment before, during, and/or after the transport of the portable housing to a customer premises. In some embodiments, the temperature control device 130 may be configured to automatically turn off when the host coupler is coupled to the host temperature control system. In some embodiments, the temperature control device 130 may be configured to regulate the temperature inside the insulated storage compartment 120 based on two or more target temperatures (e.g. refrigerate, freeze, etc.)

The host coupler 140 comprises a coupler configured to couple to a host temperature control system to allow the host temperature control system to affect the temperature inside the insulated storage compartment 120. In some embodiments, the host coupler 140 may comprise one or more vents to the insulated storage compartment that allows air to be exchanged with the host temperature control system. In some embodiments, the host coupler 140 may comprise a mechanical coupling device for securing the portable housing to the host temperature control system. The mechanical coupling device may comprise any conventional removable coupling means such as a wedge, a slot, a magnet, etc. In some embodiments, the host coupler 140 may comprise a power port for receiving power from the host temperature control system. In some embodiment, the host coupler 140 may comprise a separate power port from the power port of the temperature control device 130. The host coupler may be configured to couple to one or more host temperature control systems comprising one or more of an appliance at a customer premises, a temperature control system on a transport vehicle, and a temperature control system at a storage, distribution, and/or fulfillment center. In some embodiments, the temperature control device 130 may be configured to affect the temperature inside the insulated storage compartment 120 with a first temperature control method and the host temperature control system may be configured to affect the temperature inside the insulated storage compartment with a second temperature control method different from the first temperature control method. For example, the temperature control device 130 of the portable container 100 may comprise a vortex tube cooling system while the host temperature control system may comprise a vapor compression cooling system. In some embodiments, the temperature control device 130 may comprise a more energy efficient and/or lightweight temperature control system while the host temperature control system may comprise a more time efficient and/or heavier temperature control system. The position, size, and shape of the host coupler 140 in FIG. 1 is shown as an illustration only. In some embodiments, the host coupler 140 may be located on any of side, top, and/or bottom of the portable container 100 and may or may not protrude from the portable housing 110.

In some embodiments, the portable container 100 may comprise a sensor device for sensing one or more of a temperature in the insulated storage compartment, a movement of the portable housing, a location of the portable housing, a content of the insulated storage compartment, etc. In some embodiments, the portable container 100 may further comprise a communication device configured to communicate data collected by the sensor device to one or more of a central computer system, a host temperature control system, a delivery vehicle communication system, and a home network. The data collected by the sensor may be used by the central computer system to track the delivery and use of the portable container. In some embodiments, the data collected by the sensor may be used to ensure that items are stored at proper temperatures during transport and while at a customer's premises. In some embodiments, the data collected by the sensor may be used to determine when to retrieve a portable container from a customer premises/residence.

Figure 2:
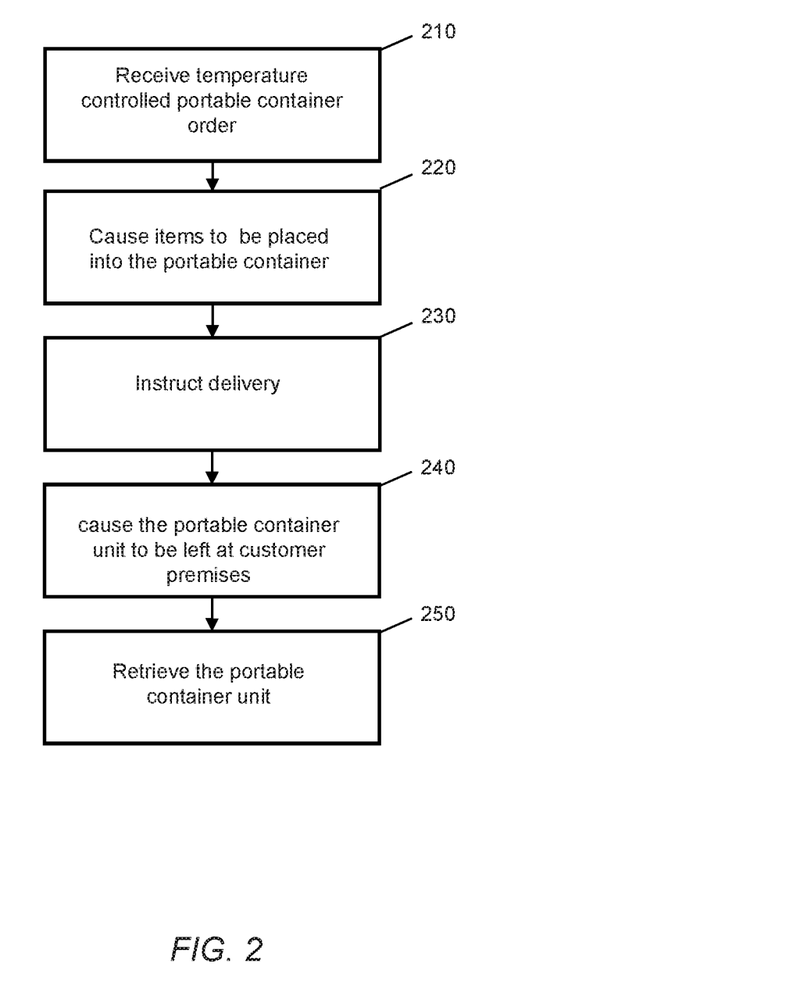
FIG. 2 is a flow diagram of a method in accordance with several embodiments.

Referring now to FIG. 2, a method for item delivery using a portable container is shown. Generally, the method shown in FIG. 2 may be implemented with one or more processor-based devices such as devices having a control circuit, a central processor, a microprocessor, and the like. In some embodiments, the steps in FIG. 2 may be tracked and/or instructed by a central computer system comprising a processor and a memory such as the computer device described with reference to FIG. 6 herein.

In step 210, the system receives a temperature controlled portable container order. In some embodiments, the order may comprise a user selection of a portable container size and/or type. In some embodiments, the order may further include a list of items to purchase. The portable container and/or the list of items may be selected via a user interface such as a web page, a mobile application, an instore user device, etc. In some embodiments, the order may be received from a user via a network such as the Internet. In some embodiments, the size and/or type of the portable container may be based on the list of items selected by the user. In some embodiments, the size and type of portable container selected by the customer may restrict the type and quantity of items that may be added to the list of items for the order. In some embodiments, the order comprises a periodic subscription (e.g. bi-weekly, monthly, quarterly, etc.) of the list of items. The order may comprise other information such as user profile, user address, user payment information, user preferences, etc. In some embodiments, the temperature controlled portable container may comprise one or more of a portable refrigerator unit, a portable freezer unit, a portable heater unit, and a portable warmer unit. In some embodiments, the temperature controlled portable container may comprise an insulated storage compartment, a temperature control device, and a portable housing. In some embodiments, the temperature controlled portable container may comprise the portable container 100 described with reference to FIG. 1.

In step 220, the system causes items to be placed into the portable container. In some embodiments, prior to step 220, the system may select a portable container and bring the portable container to a proper temperature prior to placing items into the portable container. In some embodiments, the system may assign a container identifier to one or more portable containers in the service and track the status and/or location of each container. In some embodiments, one or more portable containers on standby may be connected to a host temperature control system or be powered by the power grid to cool or heat the interior of the portable container. The portable container may be marked as ready for use when the temperature inside the container has reached a predetermined temperature and/to when a predetermined time has passed.

The items placed into the portable container may comprise items on the list of items submitted with the customer order. In some embodiments, the system may further determine additional items to be placed into the portable container such as recommended items, replenishment items, and complimentary items. In some embodiments, the system may associate a container identifier of the selected portable container with a packing list. A fulfillment system, a fulfillment center associate, and/or a motored transport unit may gather and place the items on the packing list into the selected portable container. The portable container may be connected or disconnected from a host temperature control system and/or a power source during the packing process. In some embodiments, the portable container may comprise one or more sub-compartments and the system may provide instructions on what items to place into which compartments (e.g. ice cream in the freezer compartment, lettuce in the crisper drawers, milk carton in the door compartment, etc.).

In step 230, the system instructs the delivery of the portable container unit with the items. The delivery instructions may comprise one or more transport vehicles, routes, and destinations for the portable container. In some embodiments, the portable container may be connected to a host temperature control system and/or a power source on a delivery vehicle during transport. In some embodiments, the system may further be configured to provide a delivery notification to the customer based on the location and/or delivery status of the portable container.

In step 240, the system causes the portable container unit to be left at the customer's premises. In some embodiments, the customer premises may be the customer's permanent or temporary residence, place of business, event venue, etc. The portable container unit containing items placed into the container in step 220 may be delivery to the customer premises. In some embodiments, the portable container may be left outdoors for a period of time while maintaining its interior temperature within an acceptable range. Upon receipt of the portable container, the customer may access the temperature controlled items in the portable container anytime without having to transfer the content of the portable container to a separate temperature controlled device such as a home refrigerator. In some embodiments, the customer may couple the portable container to a host temperature control system at their premises without removing the content from the portable container. In some embodiments, the customer may connect the portable container to the power grid at their premises to power the temperature control device of the portable container. In some embodiments, the customer may move the portable container to any spot in the customer premises with sufficient space. For example, the customer may choose to place a portable container in their living room next to the sofa and place another similar portable container in the bedroom. In some embodiments, the customer may travel with the portable container and plug-in the portable container to at other premises. In some embodiments, the portable container may be insulated and configured to maintain its internal temperature for some time without being powered. In some embodiments, the portable container includes a rechargeable battery that may power the temperature control device of the portable container for a period of time while the portable device is not connected to an external power source.

In some embodiments, the portable container may be left with the customer until a return process is initiated. The portable container return process may be requested by a customer when the container is no longer needed and/or when a replacement portable container stocked with new items is ordered. In some embodiments, portable container return process may be initiated by the service provider when a set period time has passed (e.g. 1 month, 3 months etc.). In some embodiments, one or more sensors on the portable container and/or a host system may detect that all items have been removed from the portable container and/or the portable container is no longer being used (e.g. the interior temperature is no longer being controlled). The sensors on the portable container may notify a central computer system and/or the customer to initiate the container return process. In some embodiments, the sensor may detect that the content of the portable container is running low and recommend a new portable container order to the customer. In some embodiments, the customer may submit a retrieval request in response to receiving a notification generated based on the data collected by the portable container unit sensor. In some embodiments, the sensor may comprise a button that the customer can push to return the portable unit.

In step 250, the system instructs the retrieval of the portable container unit. The system may send a delivery vehicle to a customer premises to collect emptied portable container units. After step 250, the system may instruct for the cleaning, maintenance, and/or inspection of returned portable container units. In some embodiments, the system may then mark the portable container unit as available for a subsequently delivery after the portable container unit retrieved from the customer is processed for reuse. With the system, each portable container unit may be delivery to and used by a number of different customers over time.

Figure 3:
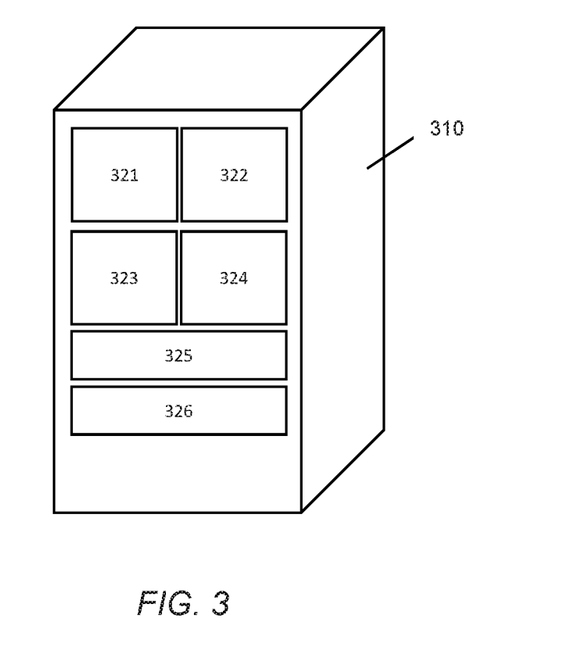
FIG. 3 is an illustration of a host temperature control system in accordance with several embodiments.

Next referring to FIG. 3, an illustration of a host system is shown. In FIG. 3 a host temperature control system 310 is coupled with portable container units 321, 322, 323, 324, 325, and 326. The host temperature control system 310 may comprise a system at one or more of a customer premises, a storage facility, a distribution center, a fulfillment center, and a delivery vehicle. In some embodiments, the host temperature control system 310 may comprise a plurality of slots for receiving a plurality of portable housings enclosing storage compartments. In some embodiments, the slots may be resizable slots with movable horizontal and/or vertical dividers. In some embodiments, the slots may be fixed. In some embodiments, one or more slots on the host temperature control system 310 may be configured to accommodate portable container unit of different dimensions. In some embodiments, an access door and/or a drawer of a portable container coupled to the host temperature control system 310 may remain accessible such that items may be added and/or removed from the storage compartment of the portable containers while the portable containers are coupled to the host temperature control system 310. In some embodiments, the host temperature control system 310 may comprise an additional door covering at least some of the portable containers. In some embodiments, the host temperature control system 310 may comprise support structures (e.g. shelves, dividers, stands) for supporting the portable container units. In some embodiments, one or more portable container units may be directly stacked on or next to another unit.

In some embodiments, the host temperature control system 310 may comprise a plurality of portable container couplers for coupling with host couplers on portable container units. In some embodiments, the portable container coupler may comprise a mechanical coupling device for securing the portable container to the host temperature control system 310. In some embodiments, the portable container coupler may comprise a mechanical coupling device for securing the portable container to the host temperature control system 310. In some embodiments, the portable container coupler may comprise a duct for coupling with a vent to the insulated storage compartment of the portable container that allows air to be exchanged between the insulated storage compartment and the host temperature control system. In some embodiments, the host temperature control system may comprise a power port for supplying power to the portable container. In some embodiments, the power port may charge a portable battery of the portable container and/or power a portable temperature control device of the portable container. In some embodiments, the portable container coupler may further comprise a data port for receiving sensor data from sensors of the portable container. In some embodiments, the host temperature control system 310 may comprise a wireless transceiver and the sensor data from the portable container may be communicated wirelessly (e.g. via Bluetooth, RFID, Wi-Fi, etc.).

In some embodiments, the host temperature control system 310 may comprise a host temperature control device configured to affect the temperature inside one or more portable container units coupled to the host temperature control system 310. In some embodiments, the temperature control device of the host temperature control system may employ one or more cooling methods comprising: vapor-compression cycle, acoustic cooling, air cycle, magnetic cooling, Malone engine, pulse tube, thermoelectric cooling, thermionic cooling, vortex tube, and water cycle systems, etc. In some embodiments, when a portable container unit is coupled to the host temperature control system 310, a vent on the portable container unit may be coupled to an air duct of the host temperature control system 310. In some embodiments, the host temperature control system 310 may be communicatively coupled to a temperature sensor for sensing the temperature inside the storage compartment of the portable container unit. In some embodiments, the host temperature control system 310 may be configured to selectively open and close the vent on the portable container unit and/or the duck coupled to the vent to regulate the temperature inside the portable container unit. In some embodiments, the portable container unit may comprise a control circuit configured to selectively open and close the vent to regulate the temperature inside the storage compartment. In some embodiments, the host temperature control device comprises a central temperature control device (e.g. a central compressor) and a duct system for circulating temperature controlled air to and from a plurality of coupled portable container units.

In some embodiments, the host temperature control system 310 may comprise one or more built-in insulated storage compartment. In some embodiments, the built-in insulated storage compartments may be temperature controlled with the same central temperature control device coupled to the portable containers. In some embodiments, the host temperature control system 310 may be configured to set the target temperatures in one or more of the portable container units and/or the built-in storage compartments to different temperatures (e.g. room, temperature refrigerator, freezer, etc.). FIG. 3 is provided as an example only. A host temperature system may comprise a variety of sizes and be configured to receive any number of portable container units of different sizes and placements without departing from the spirit of the present disclosure.

Figure 4:
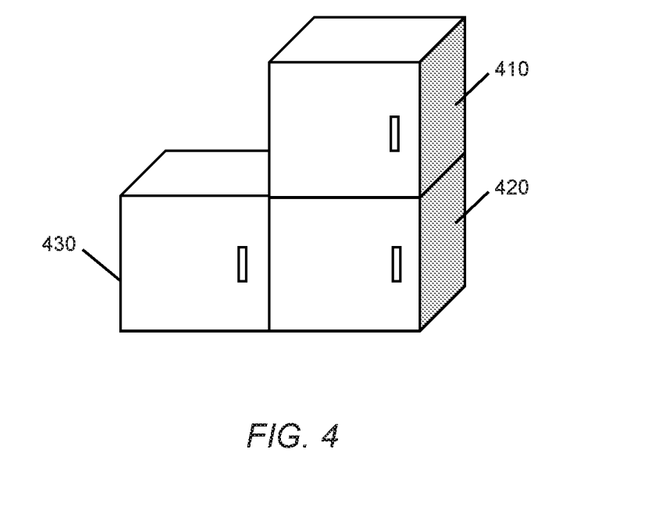
FIG. 4 is an illustration of stacked portable container units in accordance with several embodiments.

Next referring to FIG. 4, an illustration of stacked portable container units according to some embodiments is shown. In FIG. 4, portable container units 410, 420, and 430 are stacked together. In some embodiments, the housings of the portable container units may be configured to stock with one another while maintaining stability. In some embodiments, the portable container units may comprise mechanical coupler(s) for securing one portable container to another. In some embodiments, the couplers may comprise or may be similar to a host coupler.

In FIG. 4, the access doors/drawers of the portable container units that are stacked together may remain accessible such that items may be added and/or removed from the storage compartment of the portable containers while the containers are stacked. In some embodiments, the portable container may be configured to have one or more container in the stack face different directions. In some embodiments, one or more portable container units of different sizes and shapes may similarly be configured to be coupled together.

In some embodiments, the stacked portable containers may be separately connected to a power source. For example, each portable container unit may be plugged into an outlet of a power grid. In some embodiments, the portable container units may be coupled to a host temperature control system. For example, the host temperature control system may comprise one or more ducts and/or power lines for supplying temperature regulated air and/or power to the portable container units. In some embodiments, the host temperature control system may be placed under, next to, on top, or separated from the stacked portable container. In some embodiments, the host temperature controls system may comprise a similar form-factor as a portable control unit and may be stacked among the portable containers.

In some embodiments, the portable container units may form a modular refrigerator appliance with or without a host temperature control system. For example, each portable container unit may comprise a removable and replaceable module of the modular refrigerator. In some embodiments, when one module is emptied or its content is expired, a customer may request a replacement module. A delivery service may provide a replacement portable container unit stocked with items selected by a customer and/or based on a subscription plan. The emptied unit may then be swapped out with the new and stocked portable container unit in the modular refrigerator appliance.

Figure 5:
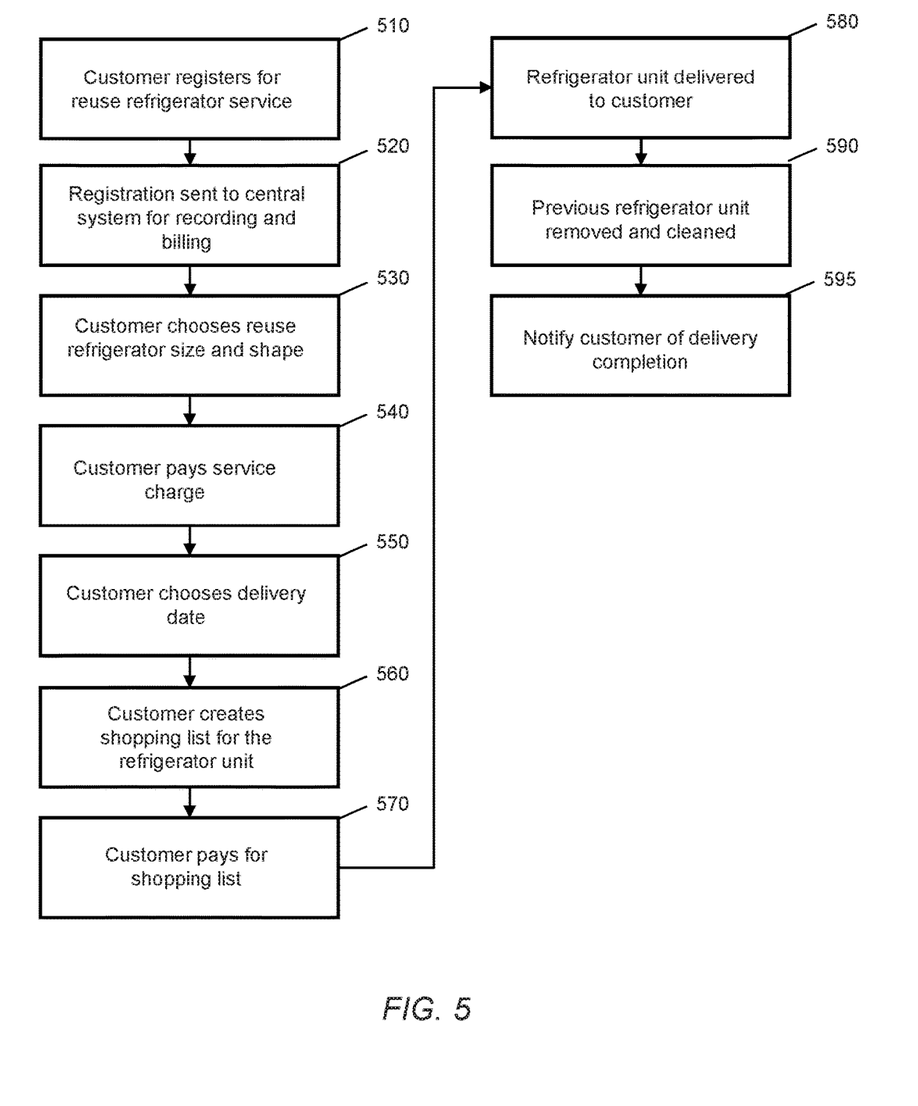
FIG. 5 is a flow diagram in accordance with several embodiments.

Next referring to FIG. 5 a flow diagram according to some embodiments is shown. In step 510, a customer registers with a reuse refrigerator service. In FIG. 5, reuse refrigerator may refer to a temperature controlled portable container unit described herein. The registration process may require the customer to enter information such as address, payment method, purchase preferences, delivery schedule references, etc. In step 520, the registration information is sent to a central system for recording and billing. In step 530, a customer chooses a reuse refrigerator size and/shape for an order. In step 540, the customer may be required to pay a service charge for the service. In some embodiments, the service charge may be charged in step 570 instead. In step 550, the customer may choose a delivery date. In step 560, the customer may create a shopping list for the refrigerator unit. The shopping list may comprise one or more items to be placed into the refrigerator unit and delivered to the customer. In some embodiments, the size and/or quantity of the items that may be selected in step 560 may be restricted based on the refrigerator unit selected in step 530. In some embodiments, the customer may be permitted to change the refrigerator unit type selected while creating the shopping list. In step 570, the customer pays for the shopping list items selected in step 560. In step 580, the refrigerator unit is delivered to the customer with the items on the shopping list. In step 590, if another refrigerator unit that is part of the reuse refrigerator service is already at the customer's location, the previous refrigerator may be removed and cleaned at a service provider facility. In step 595, the system may notify the customer that the delivery of the refrigerator unit and shopping list items is complete.

Figure 6:
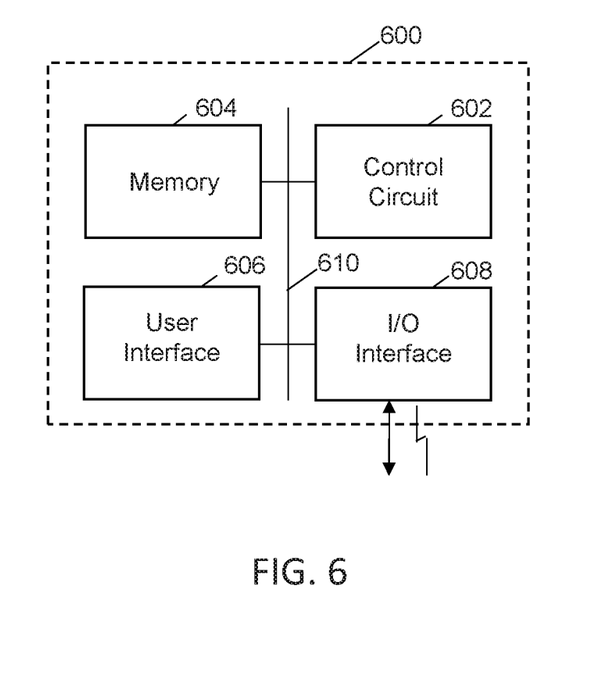
FIG. 6 comprises a block diagram of a computer device in accordance with several embodiments.

FIG. 6 illustrates a functional block diagram that may generally represent any number of various electronic components of the system for providing the portable container delivery service that is a computer type device. The computer device 600 includes a control circuit 602, a memory 604, a user interface 606 and an input/output (I/O) interface 608 providing any type of wired and/or wireless connectivity to the computer device 600, all coupled to a communication bus 610 to allow data and signaling to pass therebetween. Generally, the control circuit 602 and the memory 604 may be referred to as a control unit. The control circuit 602, the memory 604, the user interface 606 and the I/O interface 608 may be any of the devices described herein or as understood in the art. The functionality of the computer device 600 will depend on the programming stored in the memory 604. The computer device 600 may represent a high level diagram for one or more of a server for providing the portable container delivery service user interface, a central computer system for managing deliveries of portable containers and items, a user device for submitting portable container service orders, a temperature controlled portable container unit such as the portable container 100, a host temperature control system such as the host temperature control system 310, or any other device or component in the system that is implemented as a computer device.

Generally, with the use of reusable portable containers, items that are placed into temperature controlled containers at a fulfillment center may remain in the portable container until they are retrieved by the customer just prior to use/consumption. In some embodiments, a customer may have the added convenience of placing temperature controlled container units at a variety of locations. The use of temperature controlled containers may also reduce the time that items are exposed to uncontrolled environments during and after delivery.

In one embodiment, an apparatus for temperature control comprises a portable housing configured for delivery of items, an insulated storage compartment in the portable housing and configured to hold a plurality of items during a transport of the portable housing, a temperature control device configured to affect the temperature inside the insulated storage compartment, and a host coupler configured to couple with a host temperature control system to allow the host temperature control system to affect the temperature inside the insulated storage compartment. Wherein the temperature control device is configured to affect the temperature inside the insulated storage compartment without the host coupler being coupled to the host temperature control system.

In one embodiment, a method for item delivery comprises receiving, at a control circuit, a temperature controlled portable container order including a list of items from a customer, causing items on the list of items to be placed in a portable container unit, instructing, with the control circuit, a delivery of the portable container unit with items, and causing the portable container unit to be left at a customer premises until a container return request is received from the customer, wherein the portable container unit comprises an insulated storage compartment configured to hold a plurality of items during a transport of the portable container, a temperature control device configured to affect the temperature inside the insulated storage compartment, and a portable housing enclosing the insulated storage compartment and the temperature control device.

In one embodiment, a system for temperature control comprises a host temperature control system comprising one or more portable container couplers, and a plurality of portable containers, each portable container comprising: an insulated storage compartment configured to hold a plurality of items during a transport of the portable container, a temperature control device configured to affect the temperature inside the insulated storage compartment, and a host coupler configured to couple with a host temperature control system to allow the host temperature control system to affect the temperature inside the insulated storage compartment. Wherein the temperature control device is configured to affect the temperature inside the insulated storage compartment without the host coupler being coupled to the host temperature control system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for item delivery comprising:
   receiving, at a control circuit, a temperature controlled portable container order including a list of items from a customer;
   causing items on the list of items to be placed in a portable container unit including:
      an insulated storage compartment configured to hold a plurality of items during a transport of the portable container unit;
      a temperature control device configured to affect a temperature inside the insulated storage compartment;
      a portable housing enclosing the insulated storage compartment and the temperature control device
      at least one sensor having a pushable button and being in wireless communication with the control circuit;
   instructing, with the control circuit, a delivery of the portable container unit with the items on the list of items to a customer premises;
   notifying, via the at least one sensor, the control circuit that a retrieval request has been initiated by a customer in response to the customer pushing the button of the at least one sensor of the portable container unit; and
   instructing, with the control circuit, the retrieval of the portable container unit from the customer premises.

2. The method of claim 1, further comprising:
   marking the portable container unit as available for a subsequent delivery after the portable container unit is retrieved from the customer.

3. The method of claim 1, wherein the temperature control device comprises a vortex tube system.

4. The method of claim 1, wherein the portable container unit further comprises a power source for powering the temperature control device, the power source comprising one or more of: a power cord, a power port, a power adapter, and a battery.

5. The method of claim 1, wherein the temperature control device is configured to affect the temperature inside the insulated storage compartment before, during, and/or after the transport of the portable housing to the customer premises.

6. The method of claim 1, wherein the portable housing is configured to stack with other portable housings enclosing insulated storage compartments.

7. The method of claim 1, wherein the portable housing comprises a front opening access door that is accessible when a plurality of portable housings are stacked.

8. The method of claim 1, wherein the portable container unit further comprises an additional sensor for sensing one or more of the temperature in the insulated storage compartment, a movement of the portable housing, a location of the portable housing, and a content of the insulated storage compartment.

9. The method of claim 8, wherein the portable container unit is configured such that data collected by the additional sensor is communicated to the control circuit.

10. A system for item delivery comprising:
    a portable container unit comprising:
       an insulated storage compartment configured to hold a plurality of items during a transport of the portable container unit;
       a temperature control device configured to affect a temperature inside the insulated storage compartment;
       at least one sensor having a pushable button for initiating a retrieval request; and
       a portable housing enclosing the insulated storage compartment and the temperature control device; and
    a computer device comprising a control circuit executing a set of computer readable codes stored on a memory storage device, wherein the control circuit is configured to:
       receive a temperature controlled portable container order including a list of items from a customer;
       cause items on the list of items to be placed in the portable container unit;
       instruct a delivery of the portable container unit with the items on the list of items to a customer premises;
       receive, in response to the button of the at least one sensor of the portable container unit being pushed by the customer, a notification that the retrieval request has been initiated by the customer; and
       instruct the retrieval of the portable container unit from the customer premises.

11. The system of claim 10, wherein the control circuit is further configured to:
    mark the portable container unit as available for a subsequent delivery after the portable container unit retrieved from the customer.

12. The system of claim 10, wherein the temperature control device comprises a vortex tube system.

13. The system of claim 10, wherein the portable container unit further comprises a power source for powering the temperature control device, the power source comprising one or more of: a power cord, a power port, a power adapter, and a battery.

14. The system of claim 10, wherein the temperature control device is configured to affect the temperature inside the insulated storage compartment before, during, and/or after the transport of the portable housing to the customer premises.

15. The system of claim 10, wherein the portable housing is configured to stack with other portable housings enclosing insulated storage compartments.

16. The system of claim 10, wherein the portable housing comprises a front opening access door that is accessible when a plurality of portable housings are stacked.

17. The system of claim 10, wherein the portable container unit further comprises an additional sensor for sensing one or more of the temperature in the insulated storage compartment, a movement of the portable housing, a location of the portable housing, and a content of the insulated storage compartment.

18. The system of claim 17, wherein the portable container unit is configured such that data collected by the additional sensor is communicated to the control circuit.

19. The system of claim 10, further comprising a host temperature control system to allow the host temperature control system to affect the temperature inside the insulated storage compartment, and wherein the portable container unit comprises a host coupler configured to couple with the host temperature control system.

20. The system of claim 19, wherein the host coupler comprises a vent to the insulated storage compartment that allows air to be exchanged with the host temperature control system.

21. The system of claim 19, wherein the host coupler comprises a mechanical coupling device for securing the portable housing to the host temperature control system.

22. The system of claim 19, wherein the host coupler comprises a power port for receiving power from the host temperature control system.

23. The system of claim 19, wherein the host temperature control system comprises an appliance.

24. The system of claim 19, wherein the temperature control device is configured to automatically turn off when the host coupler is coupled to the host temperature control system.

* * * * *